United States Patent
Varnhagen et al.

(10) Patent No.: US 6,959,948 B2
(45) Date of Patent: Nov. 1, 2005

(54) GIMP WITH A CONCEALED SLIP ZONE

(75) Inventors: Jonathan P Varnhagen, West Bloomfield, MI (US); Stephen A Walker, Rochester Hills, MI (US); Andrew R Kavc, Oxford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 116 days.

(21) Appl. No.: 10/653,796

(22) Filed: Sep. 3, 2003

(65) Prior Publication Data

US 2005/0048242 A1 Mar. 3, 2005

(51) Int. Cl.⁷ .......................... B62D 25/16; B62D 25/18
(52) U.S. Cl. ...................... 280/849; 280/850; 296/198; 52/716.5; 52/716.8; 52/717.03; 52/717.05
(58) Field of Search ............................ 52/716.5, 716.8, 52/717.03, 717.05, 800.12; 296/198; 428/31; 280/848, 849, 850, 154

(56) References Cited

U.S. PATENT DOCUMENTS

| 1,777,435 A | * | 10/1930 | Hogelund | 52/203 |
| 2,249,421 A | * | 7/1941 | Fergueson | 280/848 |
| 2,250,136 A | * | 7/1941 | Schatzman | 280/848 |
| 2,274,134 A | * | 2/1942 | Fergueson et al. | 280/850 |
| 2,353,553 A | * | 7/1944 | Fergueson | 280/848 |
| 4,706,427 A | * | 11/1987 | Zeilinger | 52/287.1 |
| 5,139,306 A | * | 8/1992 | Ott et al. | 296/198 |
| 5,238,268 A | * | 8/1993 | Logan | 280/848 |
| 5,340,154 A | * | 8/1994 | Scott | 280/848 |
| 5,353,571 A | * | 10/1994 | Berdan et al. | 52/716.5 |
| 5,697,644 A | * | 12/1997 | Logan et al. | 280/848 |
| 5,953,881 A | * | 9/1999 | Sherry | 52/746.1 |
| 6,205,642 B1 | * | 3/2001 | Czirmer | 29/525.13 |
| 6,328,368 B1 | * | 12/2001 | Liu et al. | 296/93 |
| 6,401,418 B1 | * | 6/2002 | Senn et al. | 52/506.01 |

* cited by examiner

Primary Examiner—Robert Canfield
(74) Attorney, Agent, or Firm—Ralph E. Smith

(57) ABSTRACT

A gimp made of flexible, compressible material attaches an edge of a trim piece to a panel. The gimp is bonded to the panel without visual gaps between the gimp and the panel. The gimp has a slip connection to the trim piece. The slip connection is provided by a slot in the gimp slidably receiving the edge of the trim piece.

5 Claims, 2 Drawing Sheets

GIMP WITH A CONCEALED SLIP ZONE

FIELD OF THE INVENTION

This invention relates generally to gimps for mounting trim pieces on panels, and more particularly to a gimp having a hidden slip connection to an edge of the trim piece.

BACKGROUND OF THE INVENTION

Trim pieces are often employed to enhance the appearance of an automotive vehicle. For example, a trim piece may be used to cover an edge of a body panel, such as a wheel housing. In the past, a gimp has been secured to an edge of the trim piece to give it a finished appearance. The gimp is not secured to the body panel but merely presses against the body panel so that the gimp can shift slightly when the vehicle is moving. However, in many cases the gimp will not contact the body panel uniformly and continuously along its full length, so that gaps appear. In addition to being unsightly, gaps allow car wash brushes to get in behind the gimp and rip both the gimp and the trim piece off the vehicle. When gaps are discovered, the vehicle owner will usually bring the vehicle in for repair service. In most cases, the trim piece and gimp are thrown away and replaced, at considerable expense to the vehicle owner or to the manufacturer if the vehicle is under warranty.

SUMMARY OF THE INVENTION

In accordance with the present invention, the gimp is secured to the body panel rather than to the trim piece, so that there are no visual gaps between the gimp and the panel. Preferably, the gimp has a slip connection to the trim piece enabling the trim piece to move relative to the gimp.

In the embodiment described herein, the slip connection is provided by a slot in the gimp which slidably receives and conceals the edge of the trim piece. The slot is formed in a U-shaped portion of the gimp with spaced-apart walls defining opposite sides of the slot.

The gimp is bonded to the body panel by an adhesive. Preferably a protective strip initially covers the adhesive. The strip can be peeled away to expose the adhesive so that it can be bonded to the body panel. Preferably, a light adhesive film is provided between the edge of the trim piece and the walls of the slot. This film holds the gimp on the edge of the trim piece prior to installation, but readily breaks away after installation to free the edge and enable it to float in the slot.

It is an object of this invention to provide a gimp for mounting a trim piece on a body panel having the foregoing features and capabilities.

Further, areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
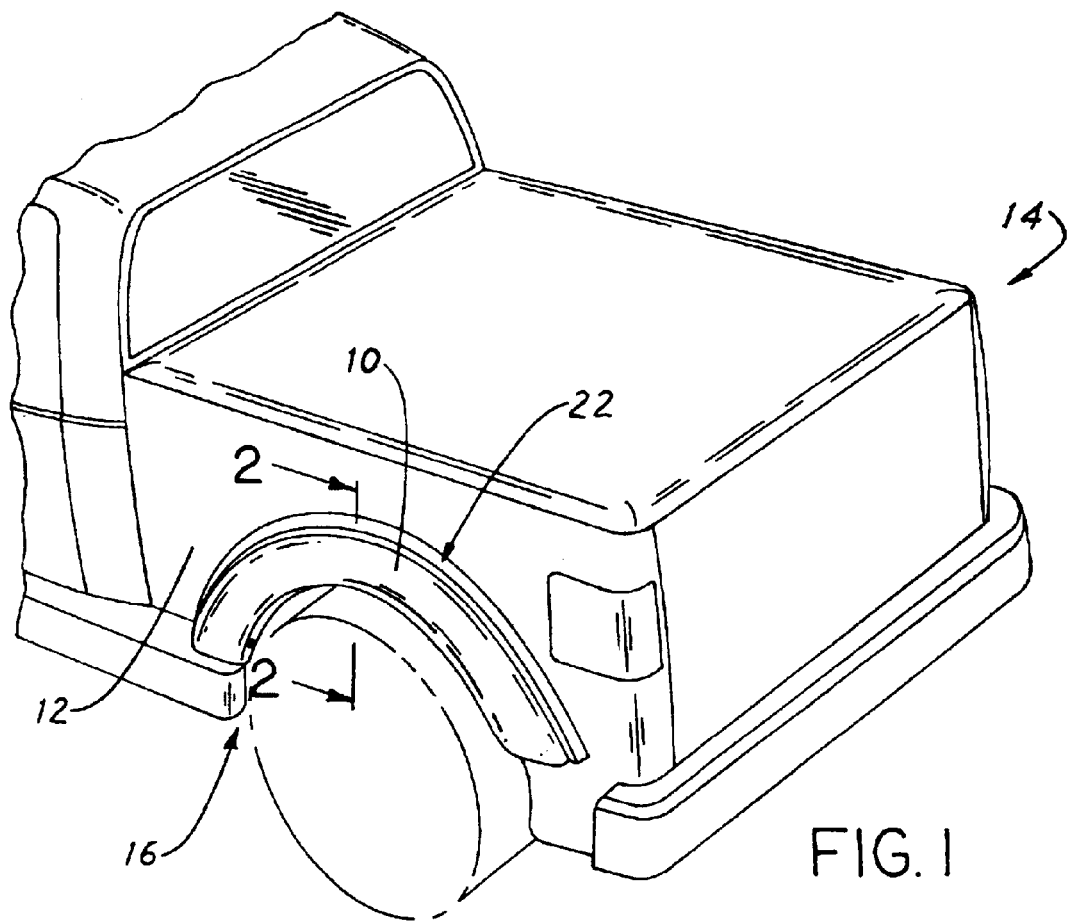
FIG. 1 is a fragmentary perspective view of an automotive vehicle having a trim strip applied to a wheel housing of a body panel by a gimp, all in accordance with the present invention.

The following description of the preferred embodiment is merely exemplary in nature and is in no way intended to limit the invention, its application, or uses.

Referring now more particularly to the drawings, a trim piece 10 is shown attached to a body panel 12 of an automotive vehicle 14. The trim piece may, for example, be made of a suitable plastic, such as ABS or polypropylene. The body panel 12 has a wheel housing 16 defined by an arcuate edge 18 of the body panel. The trim piece 10 is arcuate and follows the contour of the edge 18. The trim piece 10 has a flange 20 along its inner edge. Fasteners 21 secure the flange 20 to the body panel near the edge 18. The flange 20 is turned inward and is out of sight to the casual observer. A gimp 22 is attached to the outer edge 24 of the trim piece 10. The gimp 22 is made of a flexible, compressible material, preferably a thermoplastic or elastomeric material such as natural or synthetic rubber or a suitable olefin.

Figure 2:
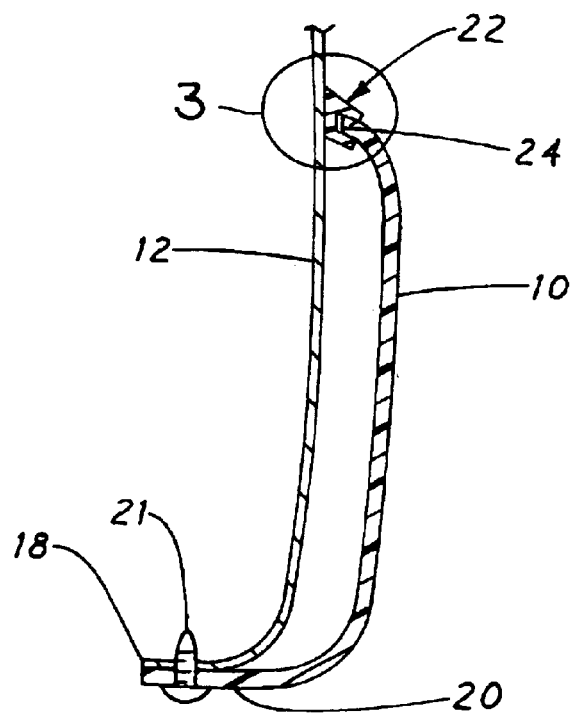
FIG. 2 is a sectional view taken on the line 2—2 in FIG. 1.
Figure 3:
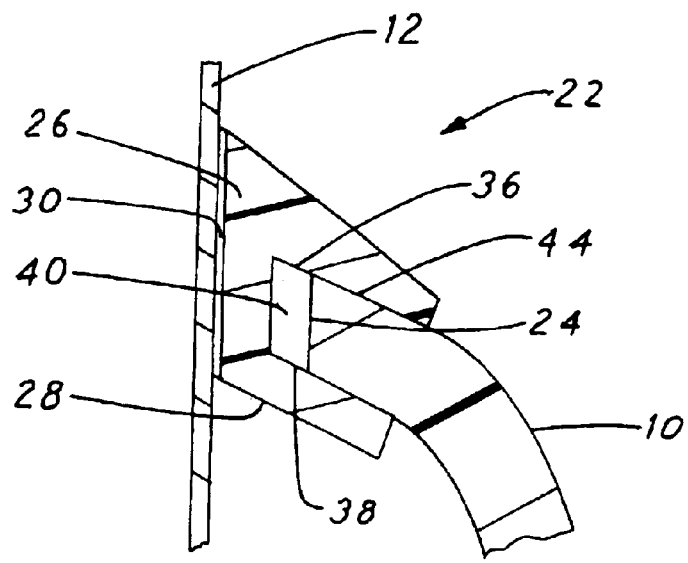
FIG. 3 is an enlargement of a portion of FIG. 2 within the circle 3.
Figures 4, 5:
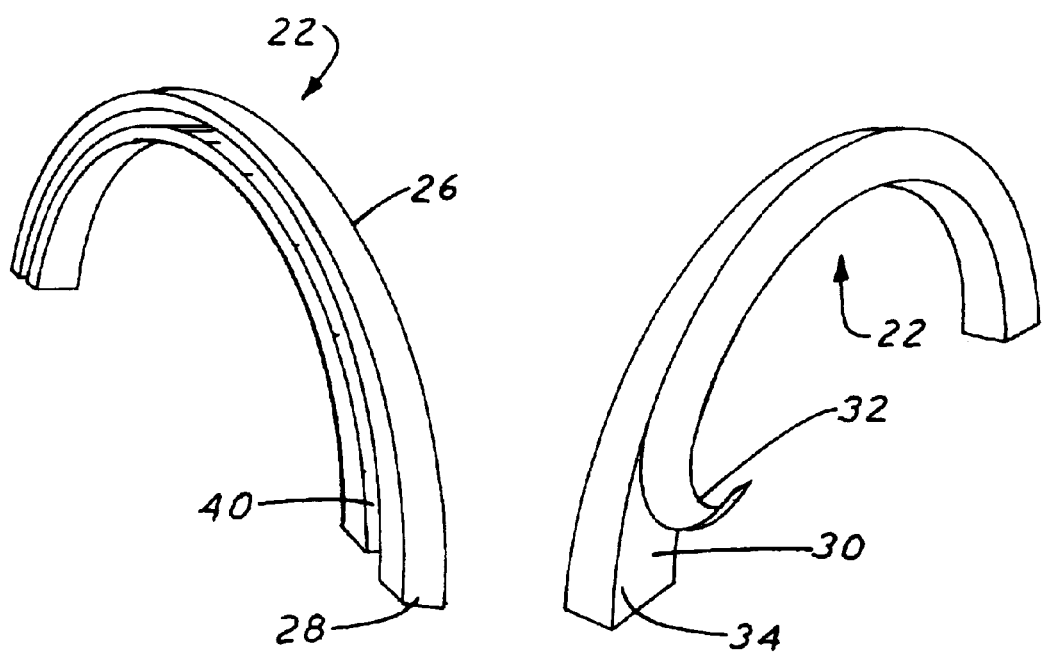
FIG. 4 is a perspective view of one side of the gimp.
FIG. 5 is a perspective view taken of the opposite side of the gimp.

The gimp 22 is an elongated member having the cross-section shown in FIGS. 2 and 3 throughout its entire length. In the exemplary embodiment, the gimp 22 has a body portion 26 and a generally U-shaped portion 28. A continuous layer of adhesive 30 is applied to the body portion 26 along its entire length. An elongated protective strip 32 (FIG. 5) covers the outer surface 34 of the layer of adhesive 30. The strip 32 can be peeled away to expose the outer surface 34 of the layer of adhesive 30 so that the adhesive can be bonded to the body panel, as explained more fully hereinafter.

The U-shaped portion 28 of the gimp has spaced-apart walls 36 and 38 defining a slot 40 between the walls. The outer edge 24 of the trim piece 10 is adapted to be slidably received and to fit within the slot and to be concealed by the slot walls 36 and 38. A light adhesive film 44 can be applied to the edge 24 of the trim piece and the walls of the slot 40. The adhesive film 44 holds the gimp on the trim piece prior to installation on the vehicle, but readily breaks away after installation so that the edge 24 can float in the slot.

In use, the cover strip 32 is peeled away to expose the outer surface 34 of the layer of adhesive 30. The outer edge 24 of the trim piece 10 is fitted into the slot 40 of the gimp 22 and a light adhesive film 44 is applied to the edge 24 and the walls 36 and 38 of the slot. The gimp 22 is pressed against the body panel 12 so that the outer surface 34 of the layer of adhesive 30 permanently bonds to the surface of the body panel, thereby affixing the gimp to the body panel. There are no gaps between the gimp 22 and the body panel 12 because of the continuous adhesively sealed contact between the two along the full length of the gimp.

The adhesive film 44 has only minimal holding power to temporarily hold the gimp to the trim piece. It will break away as soon as the vehicle is driven a short distance. The outer edge 24 of the trim piece 10 is capable of sliding in and out slightly while in the slot 40 as the vehicle moves along the highway. However, the outer edge 24 of the trim strip is completely concealed in the slot 40 so that there is a hidden slip zone between the outer edge of the trim strip and the gimp.

It will be appreciated that while the exemplary embodiment is described as using an adhesive layer 30 to attach the gimp to the vehicle, other alternative fastening arrangements, such as mechanical type fasteners, could be used as well. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In combination;

a trim piece, a gimp made of flexible, compressible material for attaching an edge of the trim piece to a panel, said gimp extending along the edge of the trim piece, a bond affixing said gimp to the panel without visual gaps between the gimp and the panel, said gimp further comprising an elongated member in bonded contact with the panel uniformly and continuously throughout the full length of the gimp, and wherein said gimp has a slip connection to said trim piece allowing relative movement therebetween.

2. The combination of claim 1, wherein said slip connection conceals the edge of the trim piece.

3. The combination of claim 1, wherein said slip correction is provided by a slot in said gimp slidably receiving and concealing the edge of the trim piece.

4. The combination of claim 1, wherein said slip connection is provided by a generally U-shape portion of said gimp having spaced-apart walls and a slot between said walls, the edge of the trim piece being slidably received in said slot and concealed in said slot by said walls.

5. The combination of claim 4, further including a light film of adhesive between the edge of the trim piece and said slot capable of readily breaking away and freeing the edge of said trim piece to float in said slot after initial installation of the edge of the trim piece in the slot.

* * * * *